Oct. 3, 1961

N. E. STRINNING 3,002,631

SUSPENSION FITTINGS

Filed Nov. 4, 1959

Nils Erik Strinning
By Eric J. Munson
Attorney

United States Patent Office 3,002,631
Patented Oct. 3, 1961

3,002,631
SUSPENSION FITTINGS
Nils Erik Strinning, La Couronne, Lutry,
Lausanne, Switzerland
Filed Nov. 4, 1959, Ser. No. 850,935
Claims priority, application Sweden Nov. 6, 1958
3 Claims. (Cl. 211—153)

This invention relates to a suspension fitting for suspension of elements, such as shelf boards, cupboards and the like, from support means of the kind which permit the elements to be disposed in several different positions, such as ladder-like shelf side supports, for instance.

The object of the invention is to provide a suspension fitting of the above indicated class, which is simpler and cheaper than the suspension fittings as used hitherto, which normally are hook-shaped, and at least at one end of the elements are provided with pivot means so that they may be swung out of the way in order to permit insertion or removal of the elements. To the above mentioned end the suspension fitting according to the invention is characterized essentially in that it comprises a pin which is slidably fitted into a bore in the element and provided with a longitudinal slot through which there extends a nail which is inserted into the element, and which pin is adapted, in the extended position thereof, to engage with the support means to support the element therefrom. According to the invention it is convenient that the slot is of such a length and the nail is disposed at such a spacing from the end surface of the element that the pin in the innermost position thereof protrudes slightly beyond the end surface of the element so that the pin may be gripped by the fingers whereas it still permits positioning of the element in the intended position and the removal of said element, respectively. Furthermore, it is convenient that the pin is cylindrical and the slot is formed with inclined or curved side walls, so that the pin is permitted to turn itself slightly in its bore. Finally, it is convenient that the pin at the lowermost side thereof is provided with a recess which ensures its engagement with the support means.

The invention will be disclosed in more details hereinafter with reference to the accompanying drawing, wherein one embodiment is illustrated.

Figure 1:
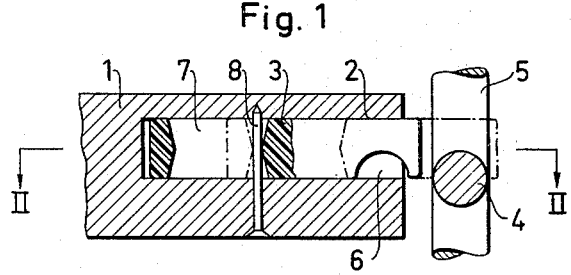
FIGURE 1 shows, partly in a vertical section, one end of a shelf board and a portion of a shelf side support.
Figure 2:
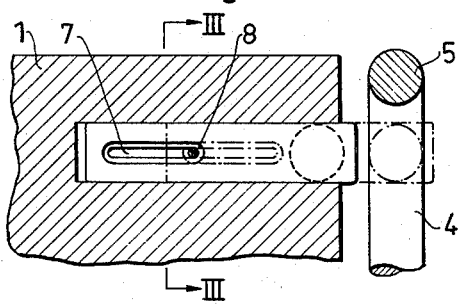
FIGURE 2 illustrates the portions in FIG. 1 in plan view with the shelf board shown in a horizontal section along the line II—II in FIG. 1.
Figure 3:
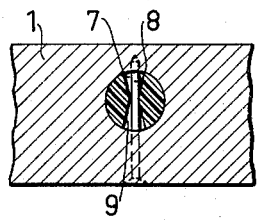
FIGURE 3 is a vertical sectional view along the line III—III in FIG. 2.

In the embodiment as illustrated in the drawing the end of the shelf board 1 is provided with a bore 2, wherein is introduced a cylindrical pin 3 of nylon, for instance. In its extended position, as shown in dash-dot lines in FIG. 1, the pin may be supported on a rod 4 of a shelf side support 5 of ladder-like construction, for instance, in which case a semicylindrical recess 6 at the lowermost side of the pin 3 ensures the engagement of the pin 3 with the rod 4. The pin 3 is provided with an elongated slot 7, which in the illustrated case is closed at the ends thereof and through which there extends a nail 8. The length of the slot 7 determines the extent to which the pin may be extended from the bore 2 and pushed into the same, respectively. As shown the nail 8 is so disposed and the slot 7 is of such a length, that a short portion of the pin protrudes beyond the end surface of the shelf board 1 when the pin is introduced as far as possible into its bore. The slot 7 is formed with curved or inclined side walls 9 so that the pin may be turned in its bore, thus permitting the shelf board to be mounted in a slight inclination with respect to the horizontal.

Modifications and alterations fall within the scope of the invention.

What I claim is:

1. A suspension fitting for shelf boards and the like comprising, a shelf board provided in one end with a cylindrical bore, a cylindrical pin snugly fitted in the bore and longitudinally slidable in the same, the pin being provided with an elongated slot extending through it, a nail driven through the shelf board at right angles to the longitudinal axis of the pin and mounted stationarily with respect to the shelf board and passing through the slot, the nail being so positioned in relation to the slot that it limits the extent of entry of the pin into the bore by contact of said nail with one end of the slot and permits a portion of the pin to extend out of the bore for finger engagement to permit of manual extension of the pin out of the bore, the slot having opposed curved side wall surfaces contacting against the nail permitting limited turning movement of the pin within the bore and on the nail.

2. A suspension fitting for shelf boards and the like as provided for in claim 1, wherein the pin is provided near its outer end with a transverse groove for fitment over a supporting rod.

3. A suspension fitting for shelf boards comprising, a shelf board provided in one end with a cylindrical bore, a cylindrical pin fitting within the bore and axially slidable therein, the pin being provided with an elongated slot extending through it, the opposite side walls of the slot being convexly curved, a nail extending upwardly from the bottom of the shelf and extending completely across the bore therein and passing through the slot between the convex walls thereof, said convex walls permitting limited rotative movement of the pin within the bore while enabling the pin to snugly fit within the bore, the pin, when fully retracted into the bore to the limit of its retractive movement presenting a forward end portion beyond the edge of the shelf to serve as a finger piece for extending the pin farther out of the bore, the length of the slot being such as to prevent, by contact with the nail, the complete retraction of the pin within the bore, and the pin being provided near its forward end with a groove for fitment over a supporting rod.

References Cited in the file of this patent

UNITED STATES PATENTS

| | | |
|---|---|---|
| 38,462 | Breckenridge | May 12, 1863 |
| 388,066 | Murphy | Aug. 21, 1888 |
| 1,024,922 | Beecher | Apr. 30, 1912 |
| 1,065,004 | Senge | June 17, 1913 |
| 1,432,640 | Szalai | Oct. 17, 1922 |
| 1,778,075 | Harris | Oct. 14, 1930 |
| 2,252,570 | Knuth | Aug. 12, 1941 |
| 2,650,036 | Berkepeis | Aug. 25, 1953 |
| 2,885,695 | Feezel | May 12, 1959 |